US010235053B1

(12) United States Patent
Derbeko et al.

(10) Patent No.: US 10,235,053 B1
(45) Date of Patent: Mar. 19, 2019

(54) METHOD AND SYSTEM FOR USING HOST DRIVER FOR FLEXIBLE ALLOCATION FAST-SIDEWAYS DATA MOVEMENTS

(71) Applicant: EMC Corporation, Hopkinton, MA (US)

(72) Inventors: Philip Derbeko, Modiin (IL); Marik Marshak, Newton, MA (US); Alexandr Veprinsky, Brookline, MA (US); Zvi Gabriel Benhanokh, Tel Aviv (IL); Arieh Don, Newton, MA (US)

(73) Assignee: EMC CORPORATION, Hopkinton, MA (US)

( * ) Notice: Subject to any disclaimer, the term of this patent is extended or adjusted under 35 U.S.C. 154(b) by 811 days.

(21) Appl. No.: 14/231,159

(22) Filed: Mar. 31, 2014

(51) Int. Cl.
*G06F 3/06* (2006.01)
(52) U.S. Cl.
CPC .......... *G06F 3/0611* (2013.01); *G06F 3/0647* (2013.01); *G06F 3/0665* (2013.01); *G06F 3/0689* (2013.01)
(58) Field of Classification Search
None
See application file for complete search history.

(56) References Cited

U.S. PATENT DOCUMENTS

| 6,510,491 | B1* | 1/2003 | Franklin | G06F 3/0601 711/114 |
| 6,763,442 | B2* | 7/2004 | Arakawa | G06F 3/0605 707/999.01 |
| 7,606,934 | B1* | 10/2009 | Vengerov | G06F 3/0611 706/21 |
| 7,643,983 | B2* | 1/2010 | Lumb | G06F 13/105 703/20 |
| 7,778,960 | B1* | 8/2010 | Chatterjee | G06F 17/303 707/609 |
| 8,010,485 | B1* | 8/2011 | Chatterjee | G06F 3/061 707/609 |
| 8,285,817 | B1* | 10/2012 | Balasubramanian | G06F 17/30079 709/219 |
| 8,407,389 | B2* | 3/2013 | Lais | G06F 13/28 710/200 |
| 8,539,197 | B1* | 9/2013 | Marshall | G06F 13/00 711/112 |

(Continued)

*Primary Examiner* — Charles Rones
*Assistant Examiner* — Hewy H Li
(74) *Attorney, Agent, or Firm* — Daly, Crowley, Mofford & Durkee, LLP

(57) ABSTRACT

Example embodiments of the present invention relate to a method, an apparatus, and a computer program product for directing I/Os for a chunk of data to a data storage system on which the chunk of data is stored. The host method includes receiving an I/O for a chunk of data, identifying to which data storage system the I/O should be sent to access the chunk of data, and sending the I/O for the chunk of data to the identified data storage system. Other example embodiments of the present invention relate to a method, an apparatus, and a computer program product for handling received I/Os during a migration of the chunk of data. The data storage system method includes migrating the chunk of data, queuing an I/O for the chunk of data received from a host during the migration, and rejecting the queued I/O as a result of the migration.

15 Claims, 9 Drawing Sheets

(56) References Cited

U.S. PATENT DOCUMENTS

| | | | | |
|---|---|---|---|---|
| 8,719,401 B1* | 5/2014 | Gulati | ................... | H04L 47/283 709/224 |
| 8,719,533 B2* | 5/2014 | Terayama | .............. | G06F 3/0607 711/154 |
| 2002/0019922 A1* | 2/2002 | Reuter | ................. | G06F 3/0605 711/206 |
| 2006/0136691 A1* | 6/2006 | Brown | .................... | G06F 3/061 711/165 |
| 2008/0168228 A1* | 7/2008 | Carr | ...................... | G06F 3/0605 711/117 |
| 2009/0006734 A1* | 1/2009 | Kishi | ................... | G06F 3/0611 711/111 |
| 2010/0199040 A1* | 8/2010 | Schnapp | ............... | G06F 3/0605 711/114 |
| 2012/0066435 A1* | 3/2012 | Colgrove | ................ | G06F 3/061 711/103 |
| 2012/0066447 A1* | 3/2012 | Colgrove | ................ | G06F 3/061 711/114 |
| 2012/0066448 A1* | 3/2012 | Colgrove | ................ | G06F 3/0617 711/114 |
| 2012/0066449 A1* | 3/2012 | Colgrove | ................ | G06F 3/061 711/114 |
| 2012/0079174 A1* | 3/2012 | Nellans | ............... | G06F 12/0246 711/103 |
| 2012/0137098 A1* | 5/2012 | Wang | .................... | G06F 3/0617 711/165 |
| 2012/0303913 A1* | 11/2012 | Kathmann | ............ | G06F 3/0607 711/162 |
| 2013/0054520 A1* | 2/2013 | Sampathkumar | ...... | G06F 3/0617 707/610 |
| 2013/0151808 A1* | 6/2013 | Suzuki | .................. | G06F 3/0607 711/171 |
| 2013/0290598 A1* | 10/2013 | Fiske | .................... | G06F 3/0625 711/103 |
| 2013/0332660 A1* | 12/2013 | Talagala | .............. | G06F 12/0246 711/103 |
| 2014/0173232 A1* | 6/2014 | Reohr | ................... | G06F 3/0611 711/162 |
| 2014/0281149 A1* | 9/2014 | Roberts | ................. | G06F 12/023 711/103 |
| 2015/0134607 A1* | 5/2015 | Magdon-Ismail | ...... | H04L 43/16 707/610 |
| 2015/0178137 A1* | 6/2015 | Gordon | ............... | H04L 67/1008 709/226 |
| 2015/0213032 A1* | 7/2015 | Powell | .............. | G06F 17/30079 707/827 |

\* cited by examiner

METHOD AND SYSTEM FOR USING HOST DRIVER FOR FLEXIBLE ALLOCATION FAST-SIDEWAYS DATA MOVEMENTS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage systems and, more specifically, to techniques for directing I/Os to a proper data storage system to reduce latency.

BACKGROUND

Host processor systems may store and retrieve data using a storage device containing a plurality of host interface units (i.e. host adapters), disk drives, and other physical storage, and disk interface units (i.e., disk adapters). Such storage devices are provided, for example, by EMC Corporation of Hopkinton, Mass., and are disclosed in, for example, U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the physical storage of the storage device directly, but rather access what appears to the host systems as a plurality of logical volumes. The logical volumes may or may not correspond to the actual disk drives and/or other physical storage.

Data storage capabilities from multiple locations and multiple physical storage devices may be integrated to present the user with a somewhat unified data schema with storage resources that a user accesses transparently and somewhat independently from the actual hardware/location used for the storage. For example, a data storage cloud may appear to an end user as a single storage system even though the data may actually be stored on a number of different storage systems that may be provided in different locations and/or may use different storage hardware. The user would see a plurality of logical storage units (LUNs) but may not know (or care) about the underlying physical storage supporting the LUNs.

In some cases, the particular location used for physical storage for particular LUNs may be optimized based on one or more criteria. For example, if physical storage is provided using two separate locations, a user may manually select one of the locations any number of reasons, such as proximity to computing resources, cost, etc. Once the initial selection is made, the user may then access the LUN without regard to the underlying physical storage. Of course, automated systems may select the underlying physical storage automatically and without user intervention using some of the same or similar criteria.

However, there may be competing criteria that result in it being desirable to provide underlying physical storage at one location for some of the time while providing the underlying physical storage at one or more other locations at different times. For example, it may be desirable to provide employee records at a first location because the storage costs are relatively low, but it may be desirable to have the records at a second (different) location once a week where payroll processing is performed. The data may be moved manually by a user prior to and after each payroll processing or may be moved by an automated process that anticipates the processing at the second location each week. In either case though, all of the employee data (e.g., the entire LUN) may be moved from the first to the second location (and back) even if only a small portion of it is needed each week for payroll processing.

SUMMARY

Example embodiments of the present invention relate to a method, an apparatus, and a computer program product for directing I/Os for a chunk of data to a data storage system on which the chunk of data is stored. A storage area network may comprise a host and a plurality of data storage systems including a first data storage system providing storage having a first latency and a second data storage system providing storage having a second latency. The host method includes receiving an I/O for a chunk of data, identifying to which data storage system the I/O should be sent to access the chunk of data, and sending the I/O for the chunk of data to the identified data storage system. Other example embodiments of the present invention relate to a method, an apparatus, and a computer program product for handling received I/Os during a migration of the chunk of data from the first data storage system to the second data storage system. The data storage system method includes migrating the chunk of data, queuing an I/O for the chunk of data received from a host during the migration, and rejecting the queued I/O as a result of the migration.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
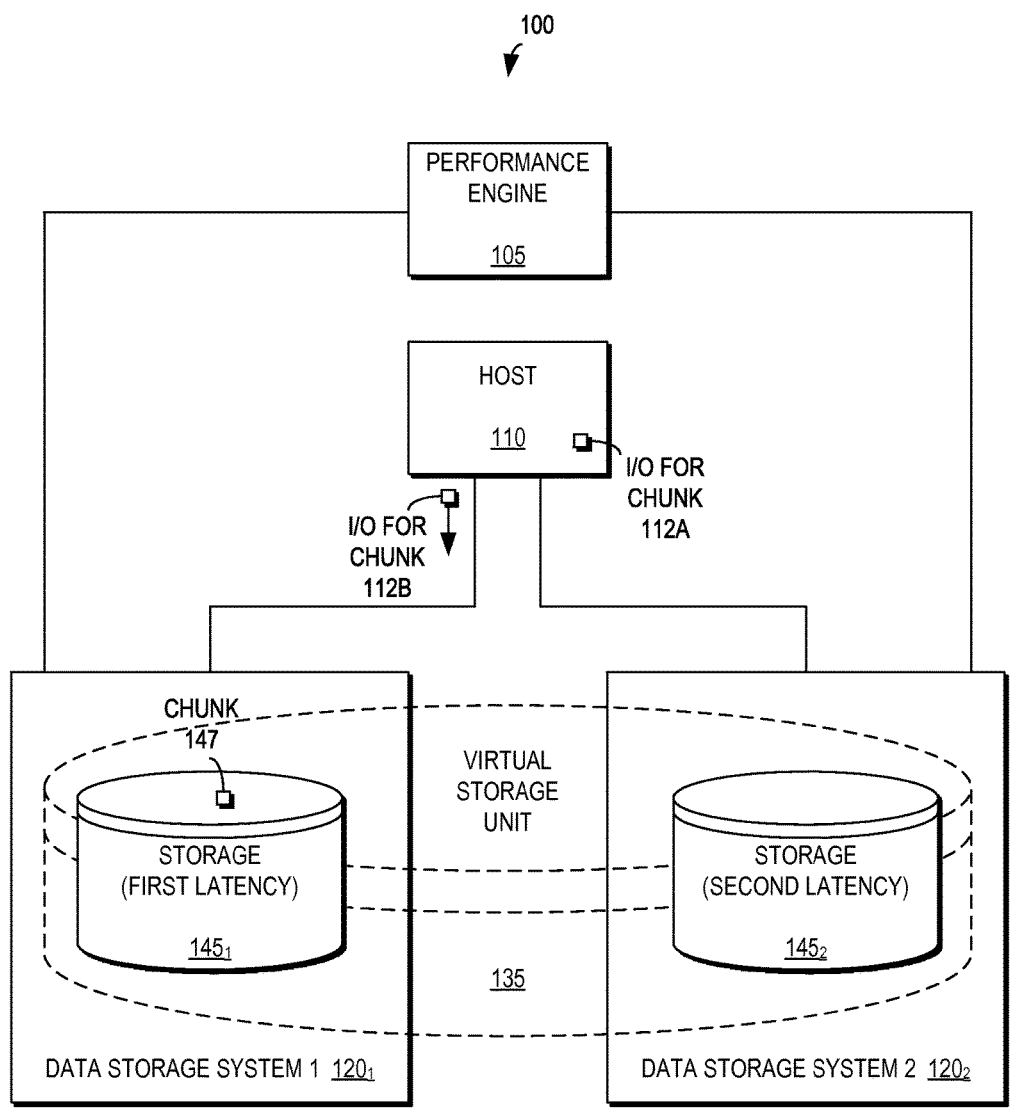
FIG. 1 is a block diagram of a system, including a host, a first data storage system, and a second data storage system, according to an example embodiment of the present invention.

Historically, large storage arrays manage many disks which have been identical. However it is possible to use different types of disks and group the like kinds of disks into Tiers based on the performance characteristics of the disks. A group of fast but small disks may be a fast Tier. As well, a group of solid state drives could be another fast Tier. A group of slow but large disks may be a slow Tier. It may be possible to have other Tiers with other properties or constructed from a mix of other disks to achieve a performance or price goal. Storing often referenced, or hot, data on the fast Tier and less often referenced, or cold, data on the slow tier may create a more favorable customer cost profile than storing all data on a single kind of disk.

In addition to a storage tier, there may be a construct referred to as a storage pool. A storage pool ("pool"), as in the case of a group of storage tiers, may be made up of devices with different performance and cost characteristics. As in the case of storage tiers, it may be advantageous to locate the hot or most accessed data to the devices within the storage pool with the best performance characteristics while storing the cold, i.e. least accessed data, on the devices that have slower performance characteristics. This can lead to a lower cost system having both faster and slower devices that can emulate the performance of a more expensive system having only faster storage devices.

Early approaches have either required the customer to only use a single kind of disk or had the customer manage different tiers of disk by designing which data should be stored on which tier when the data storage definitions are created. Typically, having customers manually manage tiers or pools of storage requires the customer to do a lot of work to categorize their data and to create the storage definitions for where the different categories of storage should be put. Previous approaches required not only categorizing the data and manually placing the data on different tiers or pools, but also keeping the data classification up to date on an ongoing basis to react to changes in customer needs. Conventionally, storage of the data has also been expanded through the use of a cache. Generally, this has led to a problem of how to determine what data to store in the cache or on what storage tier.

In certain embodiments, the current techniques may track the "temperature" of data. In general, temperature corresponds to how often and how recently the data has been accessed. In general, hot data refers to data that has been accessed often and recently. In general, cold data refers to data that has not been accessed recently or often. Usually, hot data may be stored on a faster storage tier and cold data may be migrated to a slower storage tier. In certain embodiments, the current techniques may enable data migration between storage tiers based on access requests to the data on the data storage system.

Co-owned Ser. Nos. 12/494,622, 12/640,244, 12/639,469 and 12/640,244, titled "FACILITATING DATA MIGRATION BETWEEN TIERS," "AUTOMATED DATA RELOCATION AMONG STORAGE TIERS BASED ON STORAGE LOAD," "LOGICAL UNIT MIGRATION ASSISTANT FOR HARDWARE-BASED STORAGE TIERING," and "AUTOMATED DATA RELOCATION AMONG STORAGE TIERS BASED ON STORAGE LOAD," respectively, provide a description of Fully Automated Storage Tiering (FAST), by EMC Corporation of Hopkinton, Mass., and are hereby incorporated by reference.

Traditional storage LUNs (or Virtual Storage Units (VSUs)) were limited to having extents on a single array. However, this was limiting because slow disks and fast disks were located on the same array but the characteristics of the slow disks set an upper limit of performance characteristics for the LUNs. Example embodiments of the present invention, however, enable location of hot data on a high performance data storage system, warm data on a middle performance data storage system, and cold data on a lower performance data storage system.

FIG. 1 is a block diagram of a system 100, including a host 110, a first data storage system $120_1$, a second data storage system $120_2$ (120 generally), and a performance engine 105 according to an example embodiment of the present invention. As illustrated in FIG. 1, the first data storage system $120_1$ may include storage having a first latency $145_1$ and the second data storage system $120_2$ may include storage having a second latency $145_2$. As understood in the art, the storage having the first latency $145_1$ and the storage having the second latency $145_2$, in combination, provide a virtual storage unit 135 on which a device (not shown) (e.g., a database) may be stored. In certain embodiments, the first data storage system $120_1$ may be a flash storage array, such as XtremIO by EMC Corporation of Hopkinton, Mass., and the second data storage system $120_2$ may be a traditional spinning-disk storage array, such as Symmetrix by EMC Corporation of Hopkinton, Mass.

As understood in the art, XtremIO has a lower latency than Symmetrix, and therefore is faster, but is also, typically, more expensive. Further, Symmetrix typically offers various tiers of internal storage, as described above with respect to FAST. In certain embodiments, the first data storage system $120_1$ may be an XtremIO array and the second data storage system $120_2$ may be a Symmetrix array. In other embodiments, the first data storage system $120_1$ may be a Symmetrix Series 8 storage array and the second data storage system $120_2$ may be a Symmetrix Series 7 storage array, with the Symmetrix 8 having greater performance characteristics (i.e., faster but more expensive) than the Symmetrix 7 (i.e., slower and less expensive). It is typically desirable to store more performant data on a higher-performing data storage system (i.e., first data storage system $120_1$) and less performant data on a lesser-performing data storage system (i.e., second data storage system $120_2$) because of the cost involved of the higher-performing data storage systems.

The performance engine 105 may monitor statistics regarding the storage having the first latency $145_1$ and the storage having the second latency $145_2$ and indicate to the data storage system 120 on which the a particular piece of data is stored that the data should be migrated to the other data storage system 120. Therefore, at times, the performance engine 105 may determine that data stored on the first data storage system $120_1$ having storage with the first latency $145_1$ should be stored on the second data storage system $120_2$ having storage with the second latency $145_2$ (e.g., if the data is "cold"). Likewise, at other times, the performance engine 105 may determine that data stored on the second data storage system $120_2$ having storage with the second latency $145_2$ should be stored on the first data storage system $120_1$ having storage with the first latency $145_1$ (e.g., if the data is "hot"). In such embodiments, slow changing data may reside on a lower-performing storage array (e.g., Symmetrix) while fast changing data may reside on a faster-performing array (e.g., XtremIO).

However, traditional tiering mechanisms, such as FAST, do not track on which data storage system 120 a chunk of data is stored but rather only monitor on which tier of storage internal to the particular data storage system 120 the chunk of data is stored. Further, the SCSI specification does not support portions of a device spanning multiple data storage systems 120. Therefore, example embodiments of the present invention provide flexible allocation extent-(chunk-)based storage tiering that dynamically locates portions of a device between different data storage systems 120 allowing for maximum flexibility in storage tiring, known as FAST-Sideways. It should be understood that, while only one host 110 and only two data storage systems 120 are shown in FIG. 1, example embodiments of the present invention are applicable equally to systems 100 having any number of hosts 110 and any number of a plurality of data storage systems 120. Further, it should be understood that the performance engine 105 may be a separate entity in the network 100 or may be part of the host 110 or a part of any of the data storage systems 120.

Figure 5:
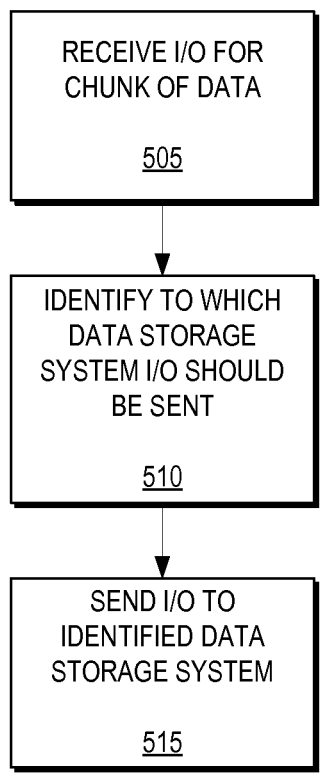
FIG. 5 is a flow diagram illustrating a method according to an example embodiment of the present invention.

FIG. 5 is a flow diagram illustrating a method according to an example embodiment of the present invention. FIGS. 1 and 5 may be described in conjunction. As illustrated in FIGS. 1 and 5, a host 110 may receive an I/O 112A for a chunk of data 147 (505) from, for example, a client (not shown). The host 110 then may identify to which data storage system 120, among a plurality of data storage systems 120 including a first data storage system $120_1$ providing storage having a first latency $145_1$ and a second data storage system $120_2$ providing storage having a second latency $145_2$, the I/O 112A for the chunk 147 should be sent from the host 110 to access the chunk of data 147 (e.g., the first data storage system $120_1$) (510). In certain embodiments, as will be described in greater detail below, the performance engine 105 may cause the data storage systems 120 to migrate data between the data storage systems 120 and update the host 110 regarding on which data storage system 120 particular chunks of data 147 are stored. The host 110 then may send the I/O 112B for the chunk of data 147 from the host 110 to the identified data storage system 120 (e.g., the first data storage system $120_1$) (515). In other words, the host 110 may determine (e.g., from a mapping) on which data storage system 120 the chunk of data 147 is stored and send the I/O 112B to the appropriate data storage system 120.

Figure 2:
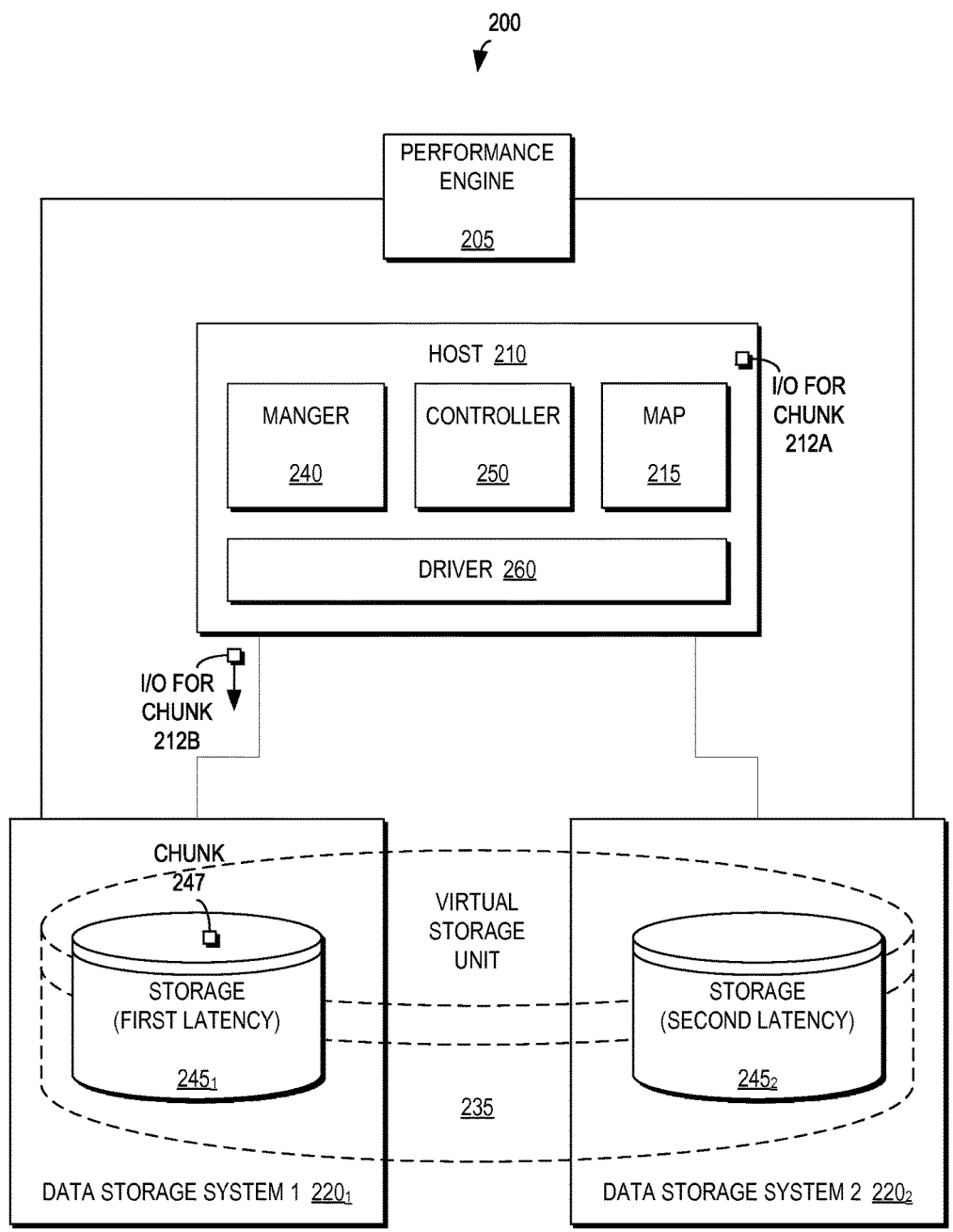
FIG. 2 is a block diagram of a host, including a manager, a controller, a map, and a driver, in the system of FIG. 1 according to an example embodiment of the present invention.

FIG. 2 is a block diagram of system 200 comprising a host 210, including a manager 240, a controller 250, a map 215, and a driver 260, a first data storage system $220_1$, a second data storage system $220_2$ (220 generally), and a performance engine 205 according to an example embodiment of the present invention. The first data storage system $220_1$ may include storage having a first latency $245_1$ and the second data storage system $220_2$ may include storage having a second latency $245_2$. As understood in the art, the storage having the first latency $245_1$ and the storage having the second latency $245_2$, in combination, provide a virtual storage unit 235 on which a device (not shown) may be stored.

As illustrated in FIG. 2, the chunk of data 247 is stored on the storage having the first latency $245_1$ on the first data storage system $220_1$. The location of the chunk may be stored in a map 215 on the host 210. In certain embodiments, as will be described in greater detail below, the data storage systems 220 provide information to the host to generate a mapping of which data storage system 220 particular chunks of data 247 are stored on. The map 215 may be an extent allocation bitmap identifying the first data storage system $220_1$ as the location for the extent embodying the chunk 247.

As illustrated in FIG. 2, and in FIG. 5 which is a flow diagram illustrating a method according to an example embodiment of the present invention, the manager 240 may receive an I/O 212A for a chunk of data 247 (505) from, for example, a client or an application running on the host (not shown). The controller 250 then may identify from the map 215 to which data storage system 220, among a plurality of data storage systems 220, the I/O 212B for the chunk 247 should be sent from the host 210 to access the chunk of data 247 (e.g., the first data storage system $220_1$) (510). The driver 260 then may send the I/O 212B for the chunk of data 247 from the host 210 to the identified data storage system 220 (e.g., the first data storage system $220_1$) (515). In other words, the controller 250 may use the map 215 to determine on which data storage system 220 the chunk of data 247 is stored and the driver 260 then accordingly may send the I/O 212B to the appropriate data storage system 220.

In certain embodiments, the driver 260 may be XtremSW caching software by EMC Corporation of Hopkinton, Mass. or PowerPath multipathing software by EMC Corporation of Hopkinton, Mass. The driver 260 may provide a service at the host 210 defining a chunk's 247 location in the system 200 (i.e., on which data storage system the chunk 247 is stored). The map 215 may map a chunk to a host port. For example, the driver 260 (e.g., XtremSW or PowerPath) may decide which host port to send the I/O 212B (i.e., to the first data storage system $220_1$ or to the second data storage system $220_2$).

In certain embodiments, the driver 260 may aggregate a plurality of device identifiers (e.g., SCSI WWIDs) into one device. The host 210 may be masked to each individual device (i.e., SCSI WWID). The host 210 may "see" each individual device (i.e., SCSI WWID) which, together, comprise all the data extents of device stored on the virtual storage unit 235. It should be understood that some chunks may be physically stored on the storage having the first latency $245_1$ on the first data storage system $220_1$ and some chunks may be physically stored on the storage having the second latency $245_2$ on the second data storage system $220_2$, but that the aggregate will comprise all chunks of the full device stored on the virtual storage unit 235. It should be understood that a device will have the same device ID on all data storage systems 220 in the system 200 as is done in Federated Live Migration (FLM) or driver encapsulation.

The driver 260 may send I/Os to the appropriate data storage system 220 according to an LBA range for the chunk to which the I/O refers. In certain examples in which a long I/O received by the host 210 spans multiple chunks, the driver 260 may break the I/O into respective separate I/Os per chunk and send the respective separate I/Os to the appropriate data storage systems 220 storing the requested chunks. The driver 260 then may "stitch" the returning information (for reads) together and send it to the requestor (e.g., a client or application).

Figure 3:
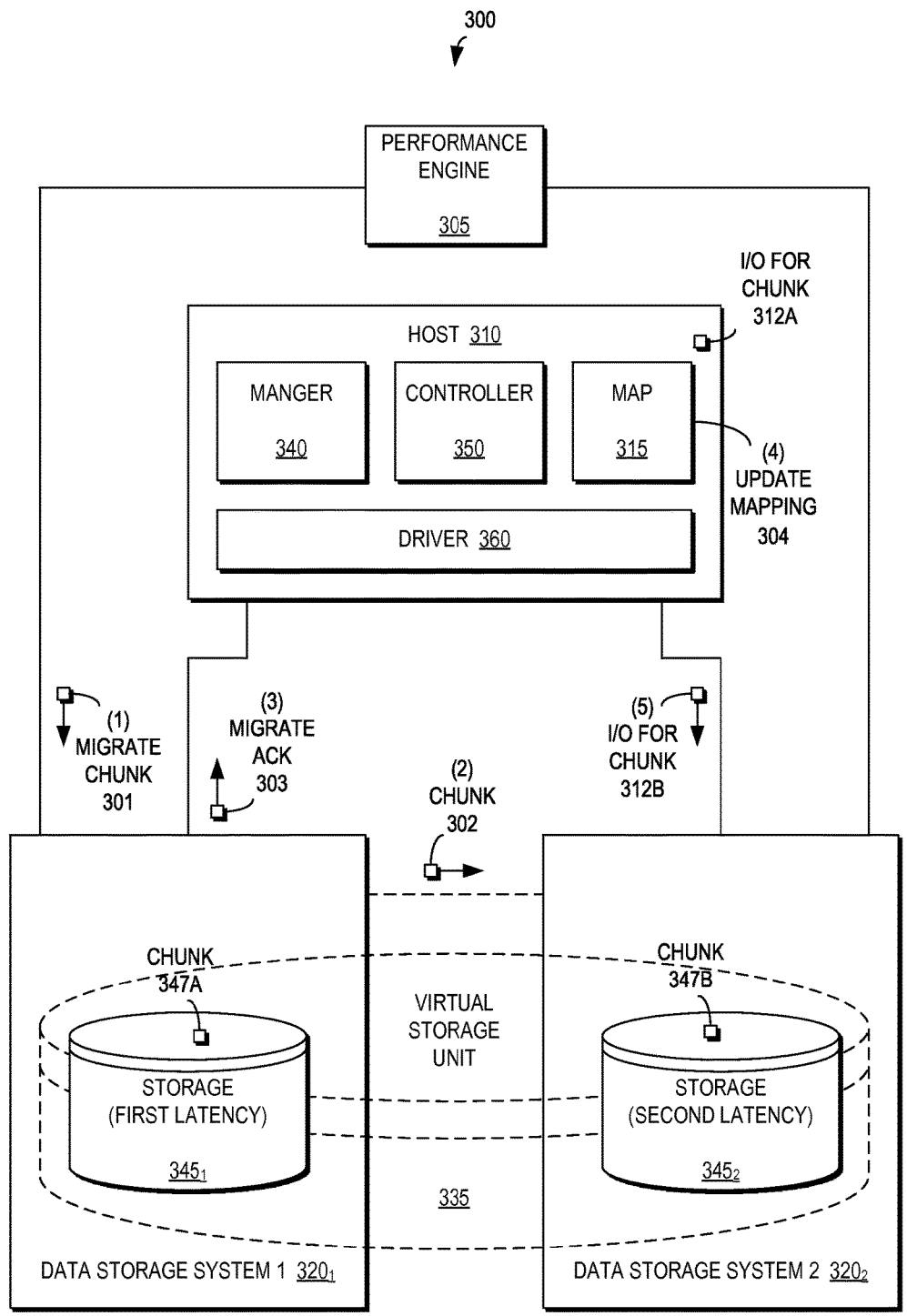
FIG. 3 is a block diagram of the system of FIG. 2 and interactions between the host, the first data storage system, and the second data storage system for migrating a chunk of data.

FIG. 3 is a block diagram of the system 300 of FIG. 2 and interactions between the host 310, the first data storage system $320_1$, the second data storage system $320_2$, and the performance engine 305 for migrating a chunk of data 347A from the first data storage system $320_1$ to a chunk of data 347B on the second data storage system $320_2$. As described above, the performance engine 305 may analyze I/O patterns for the virtual storage unit 335 and, according to "movement criteria," decide which extents fall within the move criteria and should be moved between the data storage systems 320.

As illustrated in FIG. 3, the performance engine 305 has determined that the chunk of data 347A should be migrated from the first data storage system $320_1$ to the second data storage system $320_2$. As described above, the data storage system $320_1$ storing the chunk 347A may initiate the move, such as by using Open Replicator for Symmetrix (ORS), or the host may broker the migration by a host copy mechanism. In certain embodiments, the driver 360 may provide a service at the host 310 allowing extent-based atomic relocation between data storage systems 320. For example, ORS may be used for data storage systems 320 supporting such copying between data storage systems 320. For other data storage systems 320 that do not support ORS, a host copy mechanism may be used in which the host brokers the migration by reading the data from one data storage system 320 and writing the data to the other data storage system 320. It should be understood that any of these embodiments may be interpreted as (1) migrate chunk 301 as illustrated in FIG. 3, with the chunk 347A being (2) migrated 302 to be stored as a chunk 347B on the storage having the second latency $345_2$ on the second data storage system $320_2$.

Data movement to perform the migration may be performed using a differential ORS cold push. The first data storage system $320_1$ may establish an ORS session to move the chunk 347A. Once the chunk 347 is pushed from the first data storage system $320_1$ to the second data storage system $320_2$, the controller 350 may poll in a certain interval (e.g., 5 seconds) whether the data of the chunk 347 was written to disk on the target data storage system $320_2$.

The host 310 may include a map 315 to indicate on which data storage system 320 the chunk of data 347 is stored. While the map 315 still indicates the chunk 347 is stored on the first data storage system $320_1$, the first data storage system $320_1$ (3) acknowledges 303 completion of the migration of the chunk 347 from the first data storage system $320_1$ to the second data storage system $320_2$. Once the controller 350 receives this verification that the chunk 347 has been moved to the target data storage system $320_2$ and written to disk, the controller 350 then may (4) update 304 the map 315 to indicate that the chunk 347B is now stored as a migrated chunk 347B on the second data storage system $320_2$. Therefore, in contrast to the system of FIG. 2, an I/O for the chunk 312A received by the manager 340 after migration of the chunk 347B to the second data storage system $320_2$ will be (5) directed as an I/O 312B to the second data storage system $320_2$ according to the updated map 315.

Figure 4:
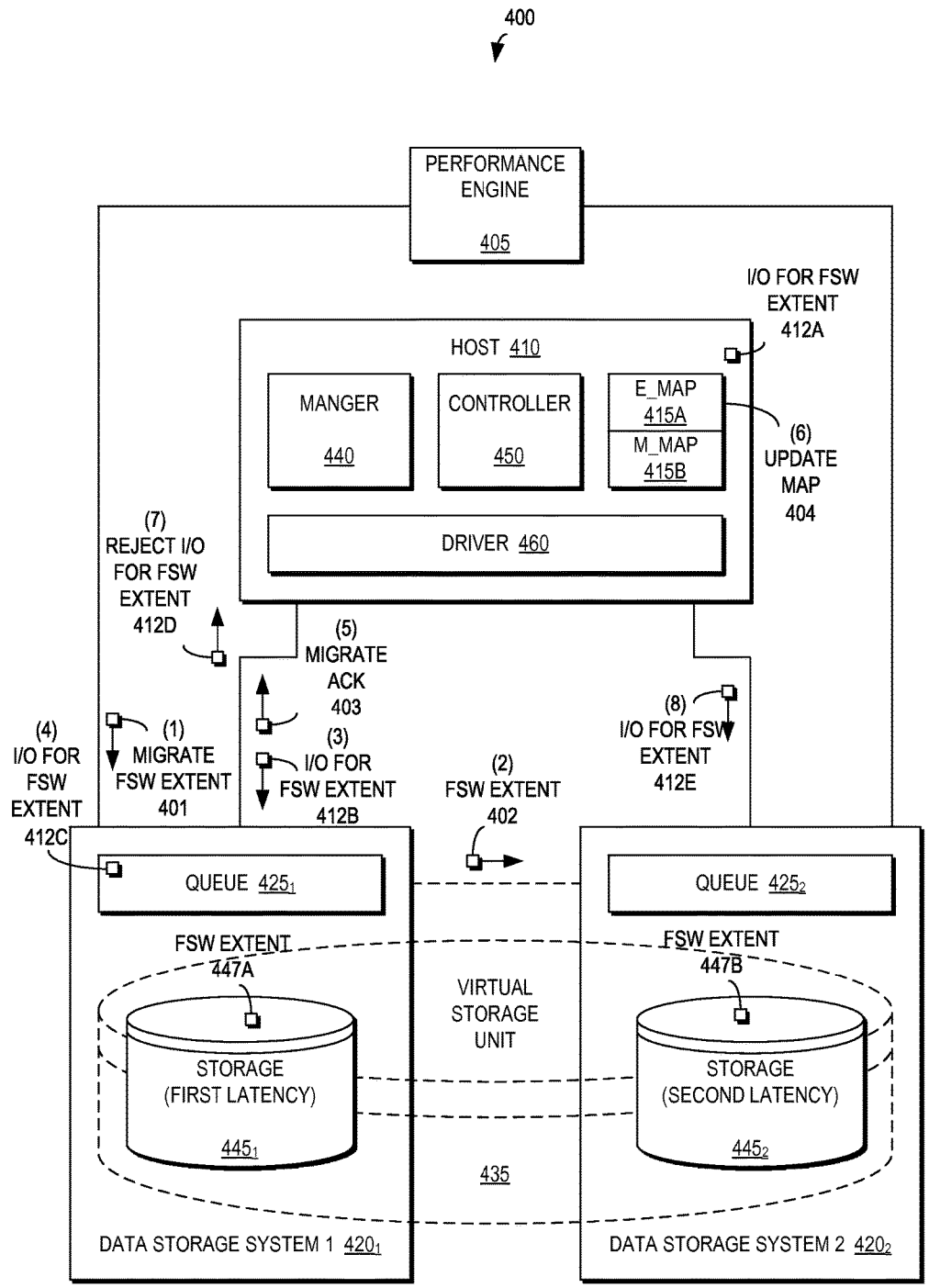
FIG. 4 is a block diagram of the system of FIG. 2 and interactions between the host, the first data storage system, and the second data storage system for migrating a chunk of data and redirecting an I/O for the chunk of data mid-migration.
Figure 6:
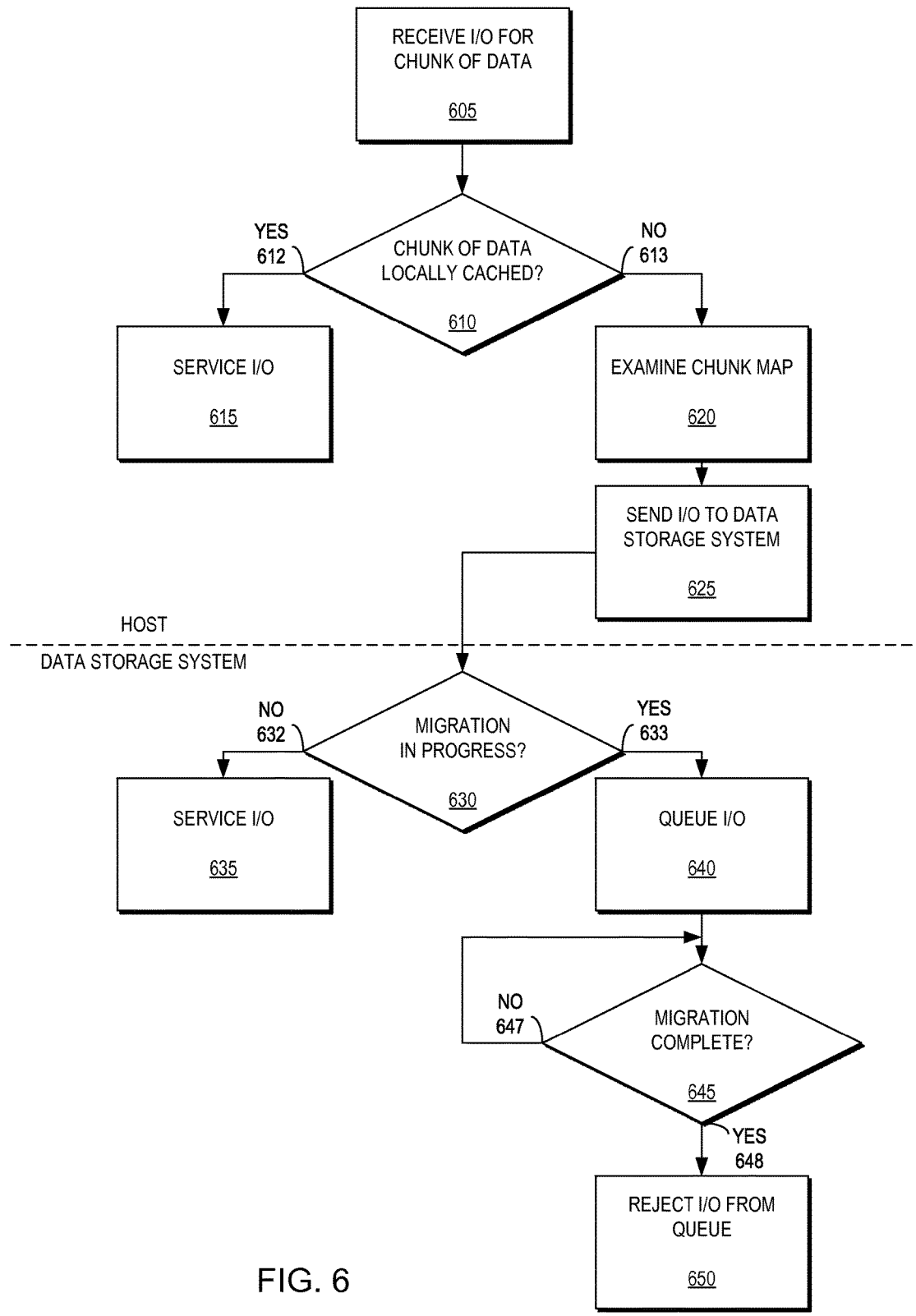
FIG. 6 is a flow diagram illustrating a method for servicing an I/O according to an example embodiment of the present invention using a local cache at a host or by a data storage system either directly or by redirection mid-migration.
Figure 7:
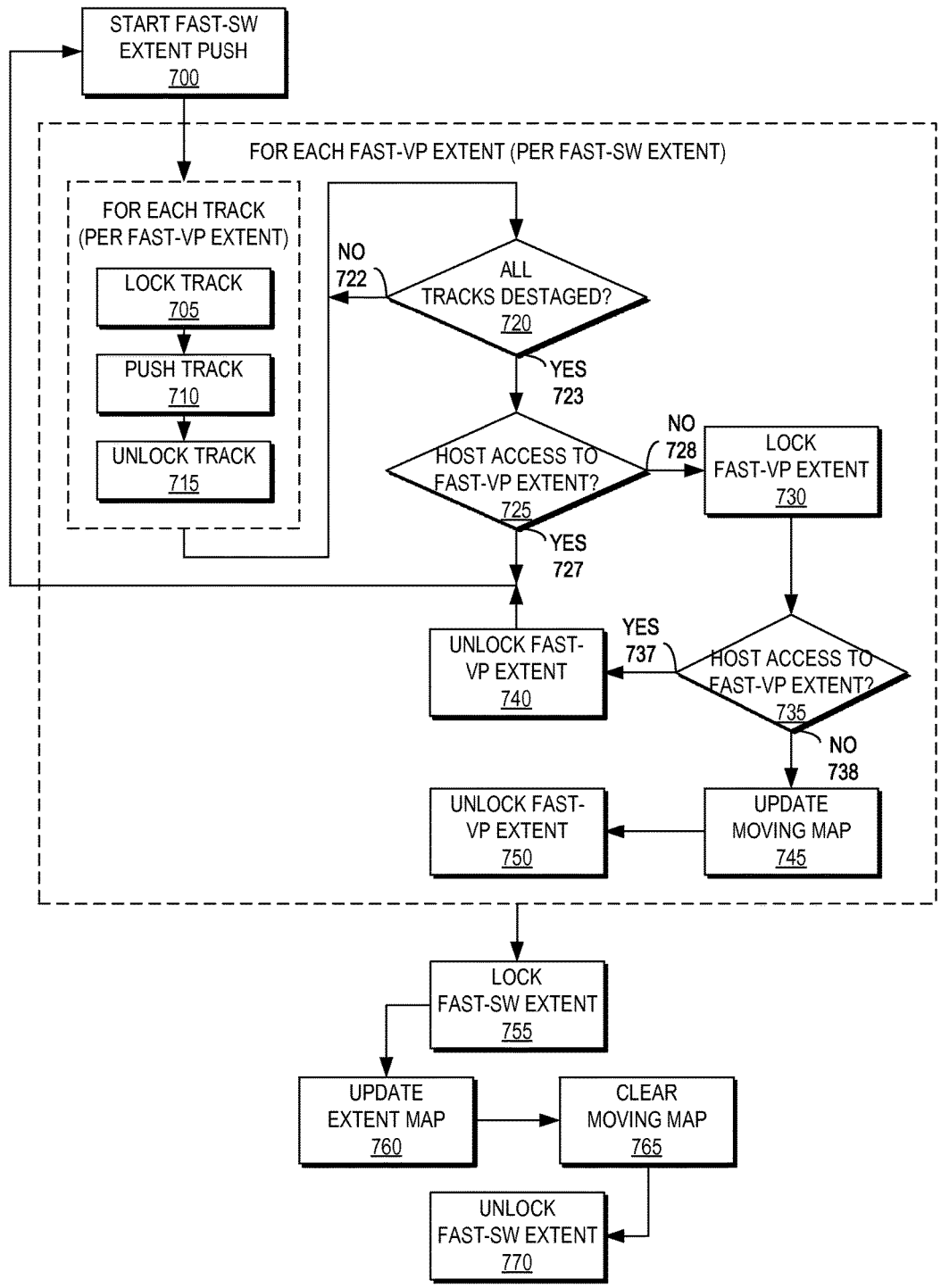
FIG. 7 is a flow diagram illustrating a method for to migrating a FAST-VP extent according to an example embodiment of the present invention.

FIG. 4 is a block diagram of the system 400 of FIG. 3 and more detailed interactions between the host 410, the first data storage system $420_1$, the second data storage system $420_2$ (420 generally), and the performance engine 405 for migrating a chunk of data 447A and redirecting an I/O 412A for the chunk of data 447A (447 generally) mid-migration. FIGS. 6 and 7 are flow diagrams illustrating methods for servicing an I/O according to an example embodiment of the present invention. FIGS. 4, 6, and 7 may be described in conjunction.

It should be understood that the chunk 447 may be a FAST-Sideways (FAST-SW) extent 447 which may be comprised of a plurality of smaller FAST-VP extents each having a plurality of FAST for Virtual Pools (FAST-VP) extents each comprised of a plurality of tracks. Further, it should be understood that I/Os to a FAST-SW extent 447A (e.g., host access) mid-migration may cause a conflict between the data stored at the first data storage system $420_1$ and the data stored at the second data storage system $420_2$.

In certain embodiments, mid-migration may refer to a time between the start and the end of the pushing of data 447 between data storage systems 420. In such embodiments, host access to a FAST-SW extent 447A mid-migration may cause the migration to fail. However, in such embodiments, the performance engine 405 has indicated a cold FAST-SW extent 447A to move, implying that the FAST-SW extent 447A has not been accessed for a period of time and thereby mitigating the risk of such mid-migration host access.

In other embodiments, mid-migration may refer to a time after the end of the pushing of the FAST-SW extent 447 between data storage systems 420 but before updating of the map (e.g., map 315 of FIG. 3) indicating on which data storage system 420 the FAST-SW extent 447 is stored. To address this risk, in certain embodiments, the map 415 may be comprised of multiple parts including an extent map (E_Map) 415A and a moving map (M_Map) 415B.

In certain embodiments, the extent map 415A may be a bitmap to identify on which data storage system 420 the FAST-SW extent 447 is stored. In terms of a migration, this data storage system 420 may be referred to as a source data storage system or a target data storage system. The moving map 415B may contain a finer granularity of the FAST-SW extent 447 being moved indicating the location of the FAST-VP extents comprising the FAST-SW extent 447 with respect to a migration. In certain embodiments, the moving map 415B may have a bit per FAST-VP extent indicating, with respect to a migration of a FAST-SW extent, whether the FAST-VP extent is stored on the source data storage system or the target data storage system (i.e., 0 representing the FAST-VP extent is on the source data storage system $420_1$ and 1 representing the FAST-VP extent is on the target data storage system $420_2$). Accordingly, at a time mid-migration, a host 410 may use the extent map 415A to determine on which data storage system 420 a FAST-SW extent 447 was originally stored (i.e., 0 indicating the first data storage system $420_1$ and 1 indicating the second data storage system $420_2$) and may "zoom in" using the moving map 415B to determine on which data storage system a particular FAST-VP extent of the FAST-SW extent 447 is stored (e.g., 0 indicating the source data storage system and 1 indicating the target data storage system).

As illustrated in FIG. 4, at a time pre-migration, the extent map 415A would indicate 0 for the FAST-SW extent 447A because it is stored on the first data storage system $420_1$ (i.e., its source data storage system). Further, the moving map 415B would indicate 0 for each FAST-VP extent of the FAST-SW extent 447A because all the FAST-VP extents are stored on the (pre-migration) source data storage system. Similarly, at a time post-migration, the extent map 415A would indicate 1 for the FAST-SW extent 447B because it is stored on the second data storage system $420_2$ (i.e., its target data storage system). Further, the moving map 415B would indicate 1 for each FAST-VP extent of the FAST-SW extent 447B because all the FAST-VP extents are stored on the (post-migration) target data storage system.

As will be described below in greater detail, when all FAST VP extents are moved from the source data storage system $420_1$ to the target data storage system $420_2$, the bit in the extent map 415A for the FAST-SW extent 447 may be switched (i.e., from 0 to 1) to indicate the FAST-SW extent 447 is stored on the target data storage system $420_2$. Further, the moving map 415B may be cleared (i.e., all values set to 0) as the second data storage system $420_2$ is now the source data storage system should a subsequent migration occur.

As illustrated in FIGS. 4 and 6, the manager 440 of the host 410 may receive an I/O 412A for the FAST-SW extent 447 (605). The manager 440 then may determine whether the FAST-SW extent 447 is locally cached (610). It should be understood that, if the driver is XtremSW, certain hot data may be locally cached at the host 410 to reduce latency in retrieving the data from a data storage system 420. Therefore, if the FAST-SW extent 447 is locally cached at the host 410 (612), the controller 450 may service the I/O 412A and provide the FAST-SW extent 447 to the requestor (e.g., an application or a client). Conversely, if the FAST-SW extent 447 is not locally cached at the host 410 (613), the controller 450 may examine the extent map 415A (620) to determine on which data storage system 420 the FAST-SW extent 447 is stored.

However, in the meantime, as illustrated in FIG. 4, the performance engine 405 may determine that the FAST-SW extent 447A should be migrated from the first data storage system $420_1$ to the second data storage system $420_2$ and (1) sends a command 401 to the first data storage system $420_1$ to push the FAST-SW extent 447A to the second data storage system $420_2$. Then, (2) the migration of the FAST-SW extent 447 may be commenced 402 from the first data storage system $420_1$ to a FAST-SW extent 447B stored on the second data storage system $420_2$.

It should be understood that, in a preferred embodiment, the FAST-SW extent 447 is migrated per FAST-VP extent, and each FAST-VP extent is migrated by track. As illustrated in FIG. 7, to migrate a FAST-VP extent, the source data storage system $420_1$ may start the FAST-SW extent push (700) and, for each track of each FAST-VP extent of the FAST-SW extent, may lock a track (e.g., to prevent host access to the track during migration) (705). The source data storage system $420_1$ then may push the track to the target data storage system $420_2$ (710), and then unlock the track (715). This process may be repeated for each track of the FAST-VP extent with the overall process repeated for each FAST-VP extent comprising the FAST-SW extent as described in greater detail below.

The source data storage system $420_1$ then may confirm with the target data storage system $420_2$ that all tracks are no longer in a "write pending" state and have been destaged from memory to disk $445_2$ (720). In other words, a FAST-VP extent is considered "checked-in" (i.e., committed) to the target data storage system $420_2$ only after the whole FAST-VP extent (i.e., each track) has been moved and destaged to disk $455_2$. If all tracks have not been destaged (722), the source data storage system $420_1$ waits for destaging to complete.

If all tracks have been destaged (723), the source data storage system $420_1$ determines whether the host 410 accessed the migrated FAST-VP extent during the migration (725). In certain embodiments, the source data storage system $420_1$ may check a local bitmap for the FAST-VP extent to determine whether host access was made to the FAST-VP extent during the migration of the FAST-VP extent from the source data storage system $420_1$ to the target data storage system $420_2$. If any value of the bitmap for the FAST-VP extent indicates access (727), the source data storage system $420_1$ retries the push. Note that the extent map 415A has not been updated so the pushed data is not used.

If the host 410 did not attempt to access the FAST-VP extent (728), the source data storage system $420_1$ then may place a lock on the FAST-VP extent (e.g., to prevent host access to the FAST-VP extent during updating of the moving map 415B) (730). The host data storage system $420_1$ then may check the local bitmap again to determine whether the host 410 accessed the FAST-VP extent subsequent to the migration of the last track of the FAST-VP extent but before the FAST-VP extent lock was put in place (735). If any of the bits of the local bitmap for the FAST-VP extent is set to 1 (737), the source data storage system $420_1$ may remove the extent lock (740) and retry the push.

If all bits of the local bitmap for the FAST-VP extent are set to 0 (738), the source data storage system $420_1$ may leave the extent lock set and notify the driver 460 to update the moving map 415B (745) to indicate the particular FAST-VP extent of the FAST-SW extent is stored on the target data storage system $420_2$. The source data storage system $420_1$ then may remove the extent lock on the FAST-VP extent (750), thereby rejecting any I/Os received by the source data storage system $420_1$ for the particular FAST-VP extent while the lock was set on the FAST-VP extent. The host 410 then may reissue the I/Os to the target data storage system $420_2$ by examining the extent map 415A (e.g., 0, indicating the FAST-SW extent was originally stored on the first data storage system $420_1$) and the moving map 415B (e.g., 1, indicating that the FAST-VP extent on which the logical address for the I/O is stored has been moved to its target data storage system (i.e., the second data storage system $420_2$)).

This process may be repeated for each FAST-VP extent comprising the FAST-SW extent. The migration may succeed with each FAST-VP extent comprising the FAST-SW extent 447A being pushed from the first data storage system $420_1$ to the second data storage system $420_2$ and committed to disk $445_2$ as FAST-SW extent 447B without intervening host 410 access. Once all bits of the moving map 415B are set to 1 (i.e., indicating that all FAST-VP extents comprising the FAST-SW extent have been pushed from the source data storage device (i.e., the first data storage device $420_1$) to the target data storage device (i.e., the second data storage device $420_2$)), the driver 460 may set the bit in the extent map 415A for the particular FAST-SW extent being pushed to 1 (i.e., indicating the FAST-SW extent is now stored on the second data storage system $420_2$).

In certain embodiments, the FAST-SW extent move is performed under I/O while being available to the host 410 (i.e., honoring all SCSI rules). Therefore, (3) the driver 460 may then send the I/O 412B to the data storage system (625) indicated by the extent map 415A (i.e., the first data storage system $420_1$). As described above, host access to the FAST-SW extent 447A during migration may cause the migration to fail; accordingly, if migration fails, at a later time, the performance engine 405 may, again, send a command 401 to the first data storage system $420_1$ to push the FAST-SW extent 447A to the second data storage system $420_2$. Further, in certain embodiments, the host 410 may periodically poll the data storage systems 420 to determine whether a migration has been requested or is in progress. If a data storage system 420 indicates that a migration has been requested or is in progress, the host 410 then may poll the data storage system 420 for mapping changes. In certain embodiments, the polling for mapping changes may be performed at a higher frequency than the polling for migration status.

To update the extent map 415A, the source data storage system $420_1$ may block I/Os for the moved FAST-SW extent 447A (i.e., I/Os from the host 410 to the source data storage system $420_1$ based on the un-updated extent map 415A) (755) to ensure the FAST-SW extent 447A is not changed until the extent map 415A is updated to indicate the FAST-SW extent 447B is stored on the target data storage system $420_2$. In certain circumstances, after the migration of the FAST-SW extent 447 but before the extent map 415A is updated, the driver 460 may (3) send the I/O 412B to the source data storage system $420_1$ (625) according to the un-updated extent map 415A. The source data storage system 420$_1$ may determine whether a migration is in progress (630) for the FAST-SW extent 447A (e.g., by using the moving map 415B). If the moving map 415B indicates that a migration is in progress (633), the source data storage system 420$_1$ may (4) place the I/O 412C in a queue 425$_1$ (640). The I/O 412C may be queued in the front end adapter (FA) of the first data storage system 420$_1$. It should be understood that, at times when a FAST-SW extent is not being migrated (632) and an extent map 415A update is not necessary (632), the data storage system may service the I/O (635). The source data storage system 420$_1$ then determines whether the migration is complete (645) and, if not (647), continues to hold the I/O 412C in the queue 425$_1$.

The source data storage system 420$_1$ may communicate with the driver 460 to change the extent map 415A to indicate the FAST-SW extent 447A is now stored on the target data storage system 420$_2$ as FAST-SW extent 447B. Accordingly, the driver 460 may (5) acknowledge the migration 403 prompting the driver 460 (6) to update the extent map 415A bit for the FAST-SW extent 447A from 0 to 1, indicating that the FAST-SW extent 447A is now stored on the second data storage system 420$_2$ (760). Additionally, the driver 460 may clear the moving map 415B (765) as all FAST-VP extents comprising the FAST-SW extent having been destaged to disk 455$_2$ and are now on their new source data storage system (i.e., the second data storage system 420$_2$).

With the extent map 415A updated, migration is complete (648), and the source data storage system 420$_1$ may unlock the FAST-SW extent (770) causing the source data storage system 420$_1$ to (7) reject 412D any I/Os in the queue 425$_1$ which, in turn, may be (8) reissued 412E by the host 410, according to the updated extent map 415A to the second data storage system 420$_2$. The second data storage system 420$_2$ then may receive the I/O 412E and determine whether a migration is in progress (630). If a migration is not in progress (632), the second data storage system 420$_2$ may service the I/O 412E (635) and provide the requested chunk of data 447B.

It should be understood that, although the figures illustrate only two data storage systems, the system may include any number of data storage systems greater than one. For two data storage systems, one bit may be used (i.e., 0 representing the first data storage system and 1 representing the second data storage system). However, for systems having more than two data storage systems, it should be understood that more than one bit in the bitmap will need to be allocated for each extent to identify the data storage system on which the extent is stored.

Figure 8:
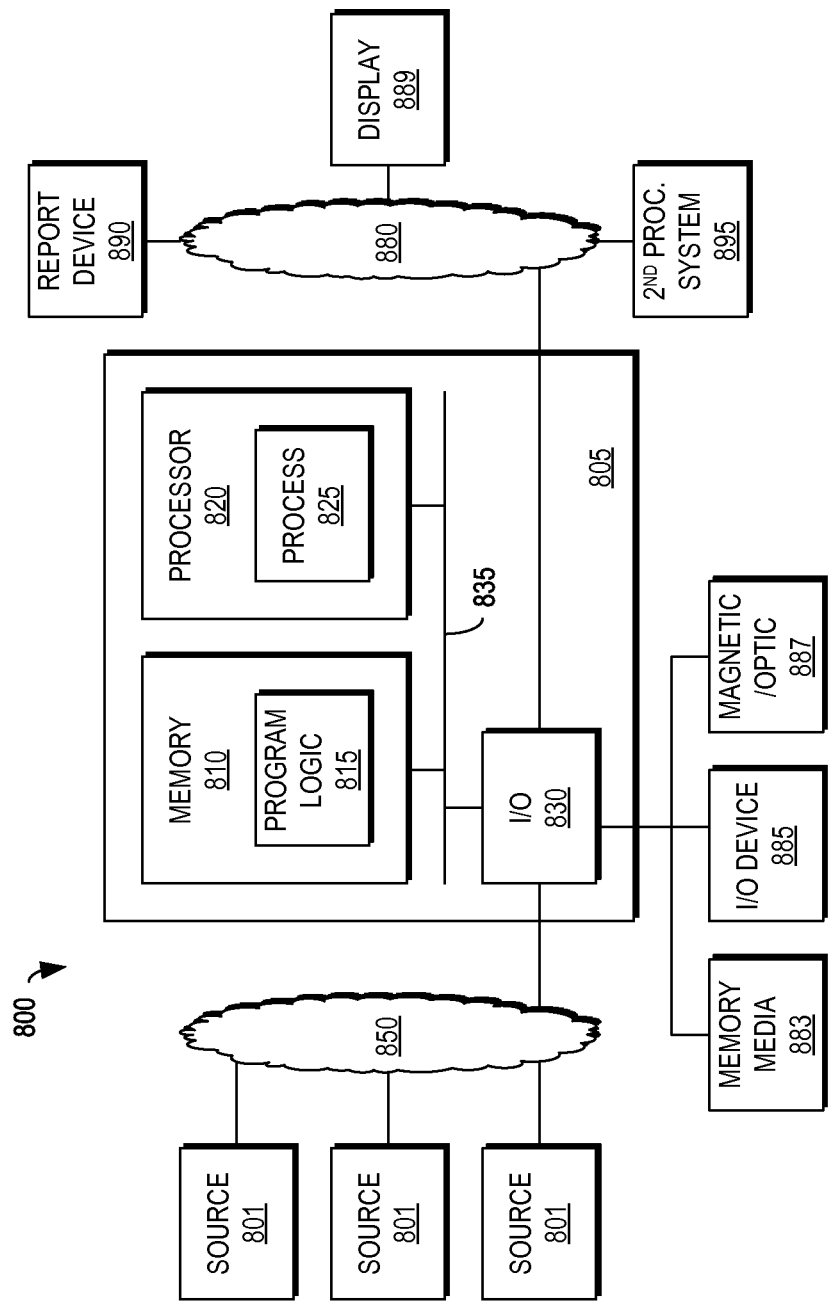
FIG. 8 is a block diagram of an apparatus according to an example embodiment of the present invention.

FIG. 8 is a block diagram of an example embodiment apparatus 805 according to the present invention. The apparatus 805 may be part of a system 800 and includes memory 810 storing program logic 815, a processor 820 for executing a process 825, and a communications I/O interface 830, connected via a bus 835.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 9:
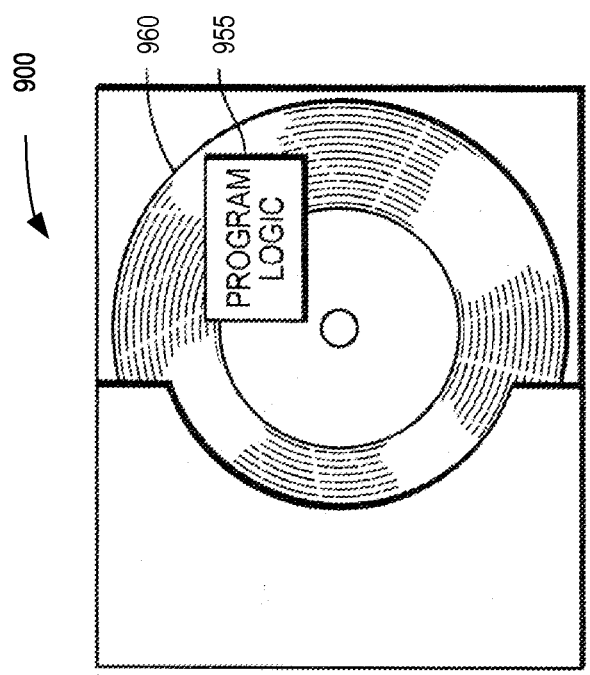
FIG. 9 is a diagram of a computer program product according to an example embodiment of the present invention.

FIG. 9 shows program logic 955 embodied on a computer-readable medium 960 as shown, and wherein the logic 955 is encoded in computer-executable code configured for carrying out the methods of this invention, thereby forming a computer program product 900.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Referring back to FIG. 1, the system 100 may include a plurality of hosts coupled to the data storage systems. The data storage system includes an internal memory that facilitates operation of the data storage system as described elsewhere herein. The data storage system also includes a plurality of host adapters (HAs) that handle reading and writing data between the hosts and the data storage system. Although the FIG. 1 shows one host coupled to each data storage system, it will be appreciated by one of ordinary skill in the art that one or more of the HAs of each data storage system may be coupled to other hosts and that one of the hosts may be coupled to more than one of the HAs.

The data storage system may include one or more Remote Data Facility (RDF) adapter units (RAs). An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RAs are coupled to an RDF link and the RAs are similar to the HAs, but are used to transfer data between the data storage system and other data storage systems that are also coupled to the RDF link. The data storage system may be coupled to additional RDF links in addition to the RDF link. For further discussion of RDF and the use thereof in data recovery and storage techniques, see U.S. Pat. No. 5,742,792, which is incorporated by reference herein, and U.S. Patent App. Pub. No. 2006-0069887 to LeCrone, et al., entitled "TRIANGULAR ASYNCHRONOUS REPLICATION," which is incorporated herein by reference.

The data storage system may also include one or more disk drives (disk assemblies), each containing a different portion of data stored on the data storage system. The disk drives should be understood as representing any appropriate type of storage media, including, without limitation, DRAM cache, flash or other solid-state storage device, tape, optical media, and/or any combination of permanent, semi-permanent and temporally-limited storage media. Each of the disk drives may be coupled to a corresponding one of a plurality of disk adapter units (DA) that provides data to a corresponding one of the disk drives and receives data from a corresponding one of the disk drives. Note that, in some embodiments, it is possible for more than one disk drive to be serviced by a DA and that it is possible for more than one DA to service a particular disk drive.

The storage space in the data storage system that corresponds to the disk drives may be subdivided into a plurality of volumes or logical storage devices. The logical storage devices may or may not correspond to the physical storage space of the disk drives. Thus, for example, the disk drive may contain a plurality of logical storage devices or, alternatively, a single logical storage device could span both of the disk drives. The hosts may be configured to access any combination of logical storage devices independent of the location of the logical storage devices on the disk drives. A device, such as a logical storage device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk drive. Other embodiments may use different structures.

One or more internal logical data path(s) exist between the DAs, the HAs, the RAs, and the memory. In some embodiments, one or more internal busses and/or communication modules may be used. In some embodiments, the memory may be used to facilitate data transferred between the DAs, the HAs and the 32n. The memory may contain tasks that are to be performed by one or more of the DAs, the HAs and the RAs, and a cache for data fetched from one or more of the disk drives. Use of the memory is described in more detail hereinafter.

The data storage system may be provided as a stand-alone device coupled to the hosts or, alternatively, the data storage system may be part of a storage area network (SAN) that includes a plurality of other storage devices as well as routers, network connections, etc. The data storage system may be coupled to a SAN fabric and/or be part of a SAN fabric. The data storage system may be a NAS. The system described herein may be implemented using software, hardware, and/or a combination of software and hardware where software may be stored in an appropriate storage medium and executed by one or more processors.

The data storage system may include a plurality of directors coupled to the memory. Each of the directors represents one of the HAs, RAs, or DAs. In certain embodiments, there may be up to sixty four directors coupled to the memory. Of course, for other embodiments, there may be a higher or lower maximum number of directors that may be used.

The data storage system also may include a communication module (CM) that provides an alternative communication path between the directors. Each of the directors may be coupled to the CM so that any one of the directors may send a message and/or data to any other one of the directors without needing to go through the memory. The CM may be implemented using conventional MUX/router technology where a sending one of the directors provides an appropriate address to cause a message and/or data to be received by an intended receiving one of the directors. Some or all of the functionality of the CM may be implemented using one or more of the directors so that, for example, the directors may be interconnected directly with the interconnection functionality being provided on each of the directors. In addition, a sending one of the directors may be able to broadcast a message to all of the other directors at the same time.

In some embodiments, one or more of the directors may have multiple processor systems thereon and thus may be able to perform functions for multiple directors. In some embodiments, at least one of the directors having multiple processor systems thereon may simultaneously perform the functions of at least two different types of directors (e.g., an HA and a DA). Furthermore, in some embodiments, at least one of the directors having multiple processor systems thereon may simultaneously perform the functions of at least one type of director and perform other processing with the other processing system. In addition, all or at least part of the global memory may be provided on one or more of the directors and shared with other ones of the directors.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method for servicing I/O requests in a distributed system including a host system, a first data storage system, and a second data storage system, the method comprising:
   receiving an I/O request associated with a chunk of data that is at least in part stored in the first data storage system, the I/O request being received at the first data storage system from the host system;
   detecting whether a migration of the chunk of data from the first data storage system to the second data storage system is currently in progress;
   when the migration is not currently in progress: fulfilling the I/O request; and
   when the migration is currently in progress: (i) adding the I/O request to a queue and keeping the I/O request in the queue while the migration remains in progress, and (ii) releasing the I/O request from the queue and rejecting the I/O request after the migration is completed and an acknowledgement is transmitted to the host system indicating that the migration is completed
   wherein the detecting of whether the migration of the chunk of data from the first data storage system to the second data storage system is currently in progress is performed by the first data storage system based on a moving map that is stored on the host system, the moving map including an indication of whether the chunk of data is being migrated.

2. The method of claim 1, wherein the first data storage system and the second data storage system, in combination, provide a virtual storage unit on which the chunk of data is stored, wherein the virtual storage unit is accessible by the host system.

3. The method of claim 1, further comprising migrating the chunk of data from the first data storage system to the second data storage system, wherein migrating the chunk of data comprises:
   receiving, at the first data storage system, a command to migrate the chunk of data to the second data storage system; and
   transmitting the chunk of data from the first data storage system to the second data storage system.

4. The method of claim 1, further comprising, after the migration is completed, transmitting the acknowledgement to the host system indicating that the migration of the chunk of data from the first data storage system to the second data storage system is completed.

5. The method of claim 1, wherein the first data storage system has a first latency and the second data storage system has a second latency.

6. A data storage system comprising:
   one or more processors; and
   a computer readable storage medium having processor-executable code stored thereon, which when executed by the one or more processors, causes the data storage system to perform a method comprising:

receiving, from a host system, an I/O request associated with a chunk of data that is at least in part stored in the data storage system;

detecting whether a migration of the chunk of data to another data storage system is currently in progress;

when the migration is not currently in progress: fulfilling the I/O request; and when the migration is currently in progress: (i) adding the I/O request to a queue and keeping the I/O request in the queue while the migration remains in progress, and (ii) releasing the I/O request from the queue and rejecting the I/O request after the migration is completed and an acknowledgement is transmitted to the host system indicating that the migration is completed, wherein the detecting whether the migration is in progress is performed by based on a moving map that is stored on the host system, the moving map including an indication of whether the chunk of data is being migrated.

7. The data storage system claim 6, wherein the data storage system and the other data storage system provide a virtual storage unit on which the chunk of data is stored and wherein the virtual storage unit is accessible by the host system.

8. The data storage system of claim 6, wherein the method further comprises migrating the chunk of data to the other data storage system, the migrating comprising receiving a command to migrate the chunk of data to the other storage system, and transmitting the chunk of data to the other data storage system.

9. A non-transitory computer readable storage medium having computer program code encoded thereon, the computer program code comprising:

computer program code for receiving an I/O request associated with a chunk of data that is at least in part stored on a first data storage system, the I/O request being received at the first data storage system from a host system;

computer program code for detecting whether a migration of the chunk of data from the first data storage system to a second data storage system is currently in progress;

computer program code for fulfilling the I/O request when the migration is not currently in progress; and computer program code for: (i) adding the I/O request to a queue when the migration is currently in progress and keeping the I/O request in the queue while the migration remains in progress, and (ii) releasing the I/O request from the queue and rejecting the I/O request after the migration of the chunk of data is completed and an acknowledgement is transmitted to the host system indicating that the migration is completed wherein the detecting of whether the migration of the chunk of data from the first data storage system to the second data storage system is currently in progress is performed by the first data storage system based on a moving map that is stored on the host system, the moving map including an indication of whether the chunk of data is being migrated.

10. The non-transitory computer readable storage medium of claim 9, wherein the first data storage system and the second data storage system, in combination, provide a virtual storage unit on which the chunk of data is stored, wherein the virtual storage unit is accessible by the host system.

11. The non-transitory computer readable storage medium of claim 9, wherein:

the computer program code further comprises computer program code for migrating the chunk of data from the first data storage system to the second data storage system, and migrating the chunk of data comprises: receiving, at the first data storage system, a command to migrate the chunk of data to the second data storage system, and transmitting the chunk of data from the first data storage system to the second data storage system.

12. The non-transitory computer readable storage medium of claim 9, wherein the computer program code further comprises computer program code for transmitting the acknowledgement to the host system indicating that the migration of the chunk of data from the first data storage system to the second data storage system is completed, the acknowledgement being transmitted after the migration is completed.

13. The non-transitory computer readable storage medium of claim 9, wherein the first data storage system has a first latency and the second data storage system has a second latency.

14. The data storage system of claim 6, wherein the method further comprises, after the migration is completed transmitting the acknowledgement to the host system indicating that the migration of the chunk of data is completed.

15. The data storage system of claim 6, wherein the data storage system has a first latency and the other data storage system has a second latency.

* * * * *